Figure 2:
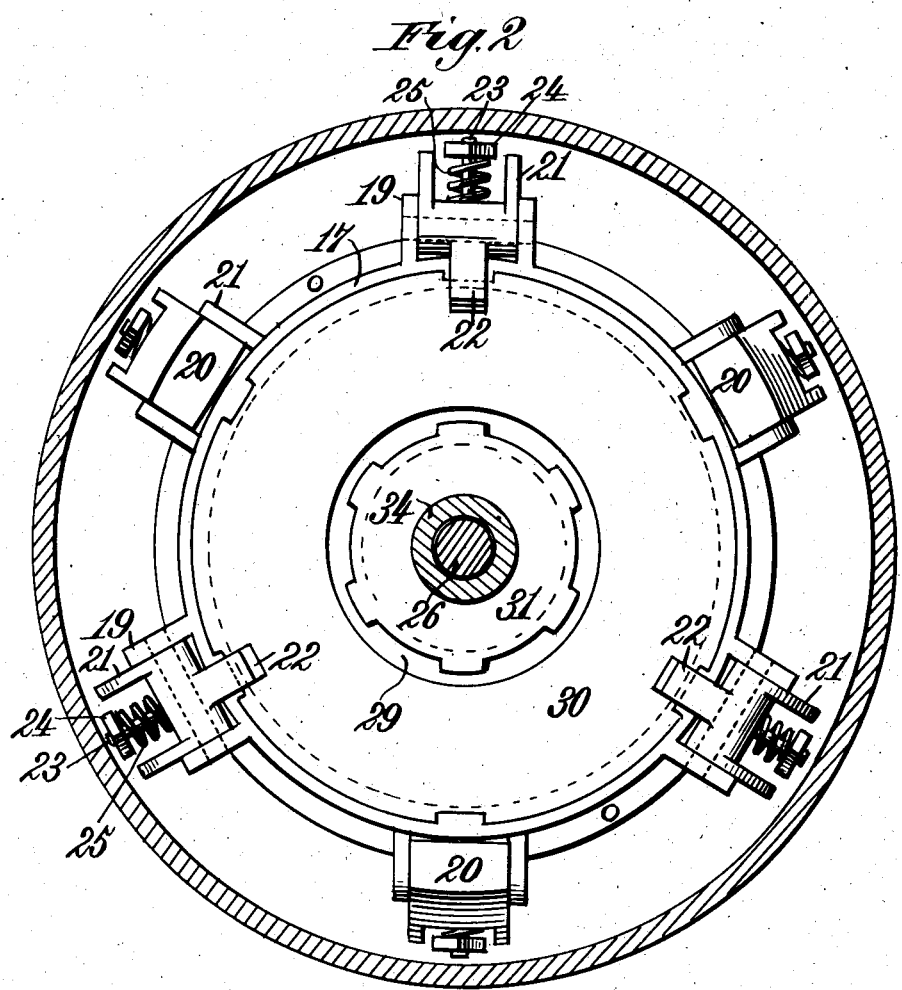

No. 766,552. PATENTED AUG. 2, 1904.
T. L. & T. J. STURTEVANT.
CLUTCH DEVICE.
APPLICATION FILED FEB. 16, 1904.
NO MODEL. 2 SHEETS—SHEET 1.
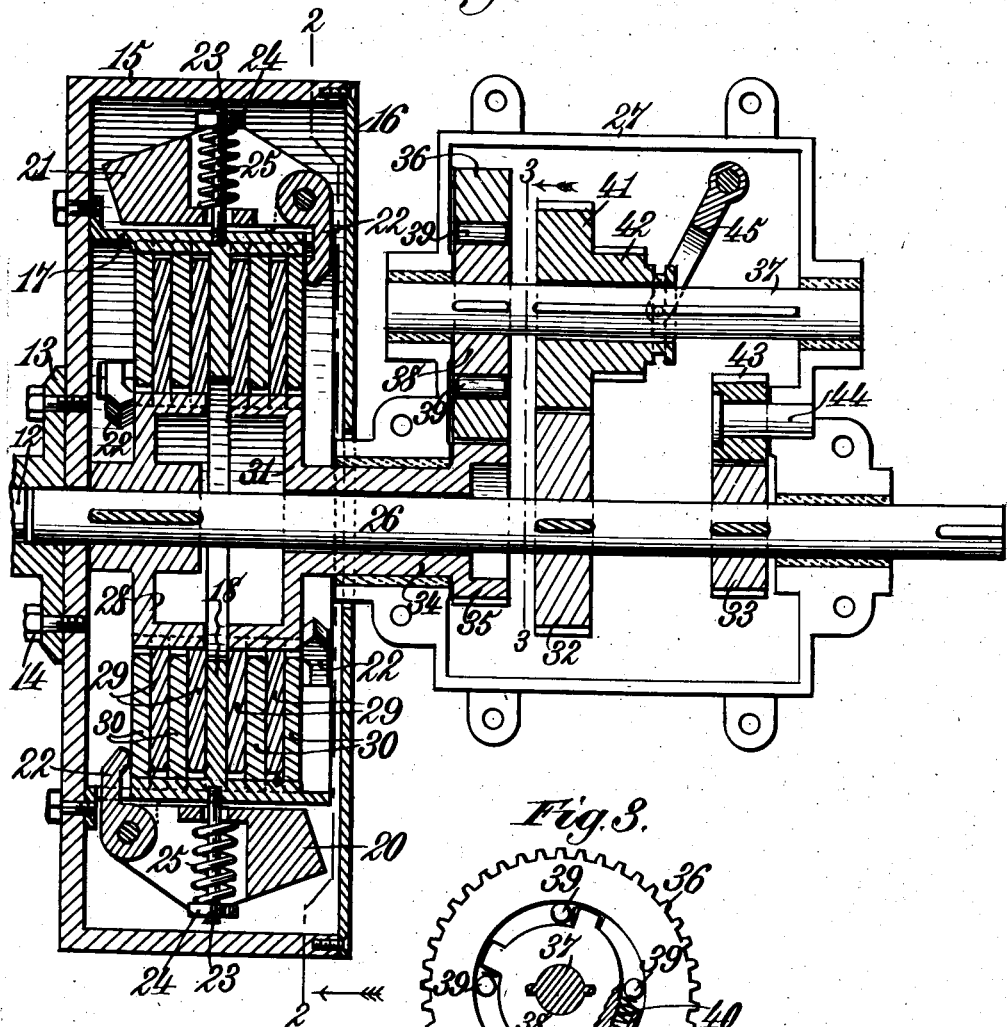
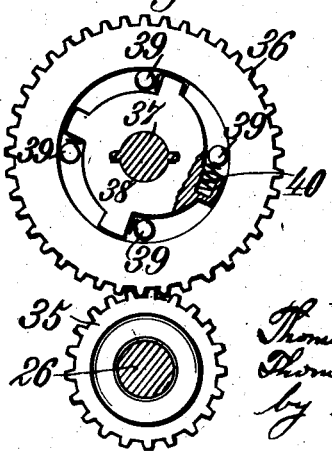
Witnesses: Inventors:

No. 766,552. PATENTED AUG. 2, 1904.
T. L. & T. J. STURTEVANT.
CLUTCH DEVICE.
APPLICATION FILED FEB. 16, 1904.
NO MODEL. 2 SHEETS—SHEET 2.

Witnesses:
Robert Cornett.
C. M. Sweeney

Inventors.
Thomas L. Sturtevant
Thomas J. Sturtevant,
by
Atty.

No. 766,552. Patented August 2, 1904.

UNITED STATES PATENT OFFICE.

THOMAS LEGGETT STURTEVANT, OF QUINCY, AND THOMAS J. STURTE-VANT, OF WELLESLEY, MASSACHUSETTS.

CLUTCH DEVICE.

SPECIFICATION forming part of Letters Patent No. 766,552, dated August 2, 1904.

Original application filed January 5, 1904, Serial No. 187,822. Divided and this application filed February 16, 1904. Serial No. 193,818. (No model.)

*To all whom it may concern:*

Be it known that we, THOMAS LEGGETT STURTEVANT, residing at Quincy, and THOMAS J. STURTEVANT, residing at Wellesley, in the county of Norfolk and State of Massachusetts, citizens of the United States, have invented certain new and useful Improvements in Clutch Devices, of which the following is a specification, reference being had therein to the accompanying drawings.

This invention relates to a friction-clutch mechanism which is centrifugally controlled in such a manner that when a power-driven part reaches a certain predetermined speed of rotation the friction-faces will be forced into clutching contact by centrifugally-applied means, so that power will then be transmitted to the part or shaft to be driven from the driving or power-driven part or shaft.

The invention preferably comprises a friction clutch mechanism of the multiple-disk type embodied in a mechanism in which two or more speeds may be imparted to the driven shaft.

In the accompanying drawings, Figure 1 is a longitudinal sectional view illustrating the present invention as being embodied in a two-speed power-transmitting mechanism. Fig. 2 is an elevation, partly in cross-section on line 2 2, Fig. 1, looking in the direction of the arrow adjacent to said line; and Fig. 3 is an elevation, partly in cross-section, on line 3 3, Fig. 1, looking in the direction of the arrow adjacent said line.

Referring to the drawings, 12 denotes a portion of an engine or power-shaft having an end flange 13, to which is rigidly attached, as by screws or bolts 14, a casing 15, adapted to serve as a fly-wheel and also, in connection with a side plate 16 attached thereto, as a housing for the clutching mechanism. Rigidly attached to the casing 15 is a ring 17, provided with a central inwardly-extending web or flange 18. The ring 17 is provided at its periphery with a series of lugs 19, in which are pivotally mounted the centrifugal clutch-controlling devices 20 and 21 and consisting of weights having right-angular arms or projections 22. Interposed between nuts 24 on studs 23, attached to the ring 17 and portions of said weights, are springs 25, which serve to hold the said weights 20 and 21 against the periphery of the ring 17 until a certain speed of rotation is reached, when the stress of said springs will be overcome and the said weights will be forced outward by centrifugal action to effect an engagement of the frictional clutch members, as will be presently described.

The clutch-casing or fly-wheel 15 is adapted to rotate independently of the power-transmitting or driving-shaft 26, which has bearings in a gear-case 27. Keyed or otherwise suitably secured to the shaft 26 is a high-speed hub or clutch-drum 28, engaged with which to rotate therewith by means of interlocking notches and projections are clutch rings or disks 29, and engaged with the ring 17 to rotate therewith, also by interlocking notches or projections, are clutch rings or disks 30, alternating with the clutch rings or disks 29. Mounted to rotate loosely on the shaft 26 is a low-speed hub or clutch-drum 31, with which are also engaged to rotate therewith a series of clutch rings or disks 29, alternating with clutch rings or disks 30, rotating with the ring 17. The clutch rings or disks 29 and 30 are free to move longitudinally of the shaft 26 for clutching and unclutching operation. The several clutch rings or disks will be forced into frictional clutching engagement with each other and with the web or flange 18 of the ring 17 by the arms 22 of the weights 20 and 21 when the speed of rotation of the clutch-casing or fly-wheel 15 is sufficient to overcome by centrifugal action the stress of the springs 25. The high-speed centrifugal weights 20 will be controlled by springs 25 of greater power or stress or placed under greater tension than the springs controlling the low-speed centrifugal weights 21, and these springs may be adjusted by means of the nuts 24 to any desired degree of tension or stress to be overcome by any desired predetermined speed of rotation of the fly-wheel or casing 15, connected with the motor or power-shaft 12.

Keyed or otherwise secured to the shaft 26 to rotate therewith are gear-wheels 32 and 33. Connected with the clutch drum or hub 31 by a sleeve 34 is a gear-wheel 35, meshing with a larger gear-wheel or gear-ring 36, connected with a shaft 37, mounted in suitable bearings in the gear-case 27 by a silent ratchet or grip device comprising a wheel 38, keyed to the said shaft and provided at its periphery with tapering recesses for the reception of clutch or grip rollers 30, with which coöperate coil-springs 40 to assist in the initial grip operation, but which springs will yield when the shaft 37 overruns in speed the gear-wheel 36, and thereby disengages the said gear-wheel from its grip or silent ratchet connection with said shaft. Splined to the shaft 37 to rotate therewith is a gear-wheel 41, meshing with the gear-wheel 32 on the shaft 27, the hub of the said gear-wheel 41 being provided with a smaller gear-wheel 42, adapted to be shifted into engagement with an idler-gear 43, rotating on a stud 44 and meshing with the gear 33, keyed to the power-transmitting shaft 26. The annularly-grooved hub of the gear 42 is engaged by a pin or pins on a shifting arm or lever 45 and by which the gears 41 and 42 may be shifted lengthwise of the shaft 37 to disengage the gear 41 from the gear 32 and to engage the gear 42 with the gear 43 when the direction of rotation of the power-transmitting shaft 26 is to be reversed.

The operation of the above-described mechanism is as follows: When the fly-wheel or clutch-casing 15 attains a speed of rotation sufficient to overcome the stress of the springs holding the low-speed centrifugal weights inward, the said weights will be forced outward and the arms 22 connected therewith will force the low-speed clutching-disks into frictional engagement with each other, and thus, through the clutch drum or hub 31, sleeve 34, gears 35 36, and the silent ratchet or grip device, will set the shaft 37 into rotation, and the latter, through the gears 41 and 32, will transmit movement to the drive or power, transmitting shaft 26. If the speed of rotation of the fly-wheel or clutch-casing 15 be increased to a point sufficient to overcome the stress of the springs 25, controlling the high-speed centrifugal weights 20, said last-named weights will be forced outward and their arms 22 will force the high-speed clutch-disks into frictional engagement with each other, and thus impart movement to the power-transmitting shaft 26 direct through the clutch-drum 28, keyed to said shaft. The gears 35 and 36 are so proportioned relative to each other as to impart a lower speed of rotation to the shaft 37, and consequently to the shaft 26, through the gears 41 and 32, than will be imparted to the said shaft 26 when the high-speed clutch device is in operation, and consequently when the shaft 26 is running at the higher speed its gearing connection with the shaft 37 will cause the said shaft to overrun the speed of rotation of the gear-wheel 36, so that the said gear-wheel 36 will have a relative backward movement which will disengage the clutching-rollers 39 from said gear-wheel and allow the silent ratchet or grip device connecting said gear-wheel with said shaft 37 to run free, and consequently the gearing connections with the low-speed clutch-disks will run idly when the high-speed clutch-disks are engaged. If, however, the duty or load on the power-transmitting shaft 26 becomes too great for the power received from the motor or driving-shaft for the high speed at which the mechanism may be running, or if the power received from the motor or power-shaft be lessened, so as to reduce such high speed below the point at which the high-speed centrifugal clutch-weights are set to operate, the high-speed clutches will cease to act and the low-speed clutches will immediately come into operation and continue the rotation of the power-transmitting shaft, but at a reduced rate of speed, through the lower gearing connecting the low-speed clutch-disks with the said power-transmitting shaft 26. If at any time the load or duty on the power-transmitting shaft becomes sufficiently heavy or great to throw the low-speed clutches out of action by reducing the speed of rotation of the fly-wheel and clutch-gearing casing 15 below the predetermined speed-point for which the low-speed centrifugal clutch-weights may be adjusted, the motor or power-shaft will become entirely disengaged from the power-transmitting shaft 26, and the engine or motor will then run free until it attains a speed sufficient to again engage the low-speed clutch device.

In view of the fact that the multiple-disk clutch devices are inclosed or housed in the fly-wheel or casing 15, with its side plate 16, dirt or dust will be effectively excluded from the said clutch devices, and, moreover, the inclosing casing is adapted to contain a lubricant, so that the clutch devices may run in oil, which will prevent undue wear and friction when the clutch parts or disks are being engaged or disengaged or at other times and when there will be more or less slip or relative movement between the several parts. These centrifugally-controlled multiple-disk clutch devices providing, as they do, a plurality of clutching parts, which may be increased at will, according to the requirements of any particular mechanism to be driven, afford very strong and powerful friction-clutches, notwithstanding the fact that they may be kept lubricated for the purpose just above indicated.

The present invention is not to be understood as being limited to the details of construction herein shown and described, as such details may be varied widely without departing from the essence of the invention.

We do not herein claim the two-speed clutch mechanism and gearing herein shown and described, as the same is claimed in our power-transmitting-mechanism application, Serial No. 187,822, filed January 5, 1904, of which application this present case is a division.

Having thus described our invention, we claim and desire to secure by Letters Patent—

1. In a power-transmitting device, the combination with a ring provided with a central internal web or flange, of means for rotating said ring, two sets of friction clutch-disks within said ring, on opposite sides of said web or flange, one set of clutch-disks engaging said ring, to rotate therewith, chutch hubs or drums with which the other set of said clutch-disks are engaged to rotate therewith, pivoted centrifugal weights having arms to force said disks into clutching contact when said weights are swung outward, and a shaft on which said clutch hubs or drums are mounted and with which they are operatively connected.

2. In a power-transmitting device, the combination with a ring provided with a central internal web or flange, of two sets of friction clutch-disks within said ring on opposite sides of said web or flange, one set of clutch-disks engaging said ring, to rotate therewith, clutch hubs or drums with which the other set of said clutch-disks are engaged to rotate therewith, pivoted centrifugal weights having arms to force said disks into clutching contact when said weights are swung outward, a shaft on which said clutch hubs or drums are mounted and with which they are operatively connected, and a rotating fly-wheel or casing inclosing said ring, weights, disks and hubs or drums.

In testimony whereof we affix our signatures in presence of two witnesses.

THOMAS LEGGETT STURTEVANT.
THOMAS J. STURTEVANT.

Witnesses:
W. H. ELLIS,
L. H. STURTEVANT.